April 28, 1925.

O. A. COLBY

VERTICAL OVEN

Filed March 1, 1923

1,535,579

2 Sheets-Sheet 1

WITNESSES:

INVENTOR
Ora A. Colby
BY
ATTORNEY

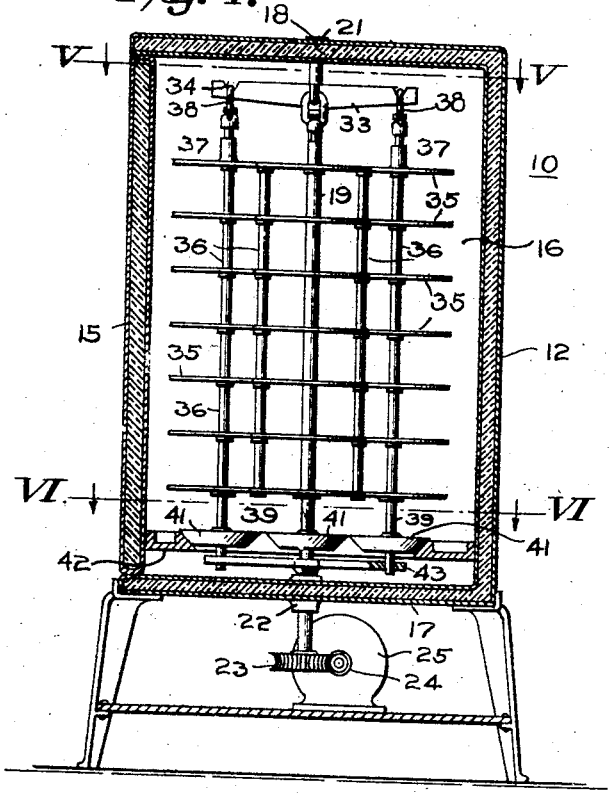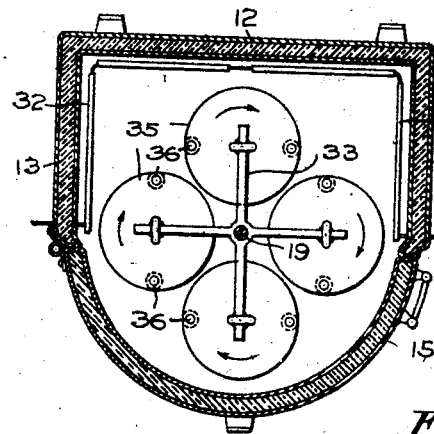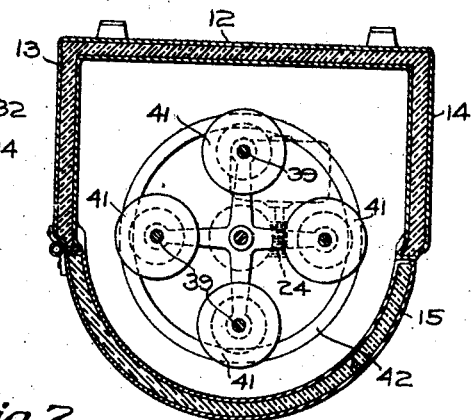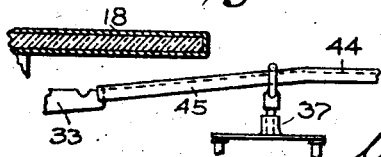

Patented Apr. 28, 1925.

1,535,579

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

VERTICAL OVEN.

Application filed March 1, 1923. Serial No. 622,057.

*To all whom it may concern:*

Be it known that I, ORA A. COLBY, a citizen of the United States, and a resident of Irwin, in the county of Westmoreland and State of Pennsylvania, have invented a new and useful Improvement in Vertical Ovens, of which the following is a specification.

My invention relates to ovens and particularly to electrically heated ovens.

The object of my invention is to provide a relatively simple and compact oven structure for heat-treating materials.

In practicing my invention, I provide a plurality of co-operating heat-insulating walls, certain of which are of plane, and one of which is of arcuate contour, enclosing an oven chamber which may be considered as comprising two portions, one of which is of substantially rectangular cross-section and the other of which is of substantially semi-circular cross-section. A vertically-extending, rotatable shaft is located in said chamber and extends therebelow and is driven by any suitable operating means. A plurality of horizontally extending trays are secured to the shaft, on which trays the material to be heat treated is placed. Electric heating elements are located in the oven chamber against the walls of plane contour and are substantially co-extensive therewith.

In a modified form of my invention, I provide a plurality of radially extending arms at the upper end of the shaft, on which removable frames, each comprising a plurality of spaced trays may be hung. Means is provided for causing said frames and trays to rotate relatively to the respective supporting arms, as the shaft is rotated.

Figure 1:
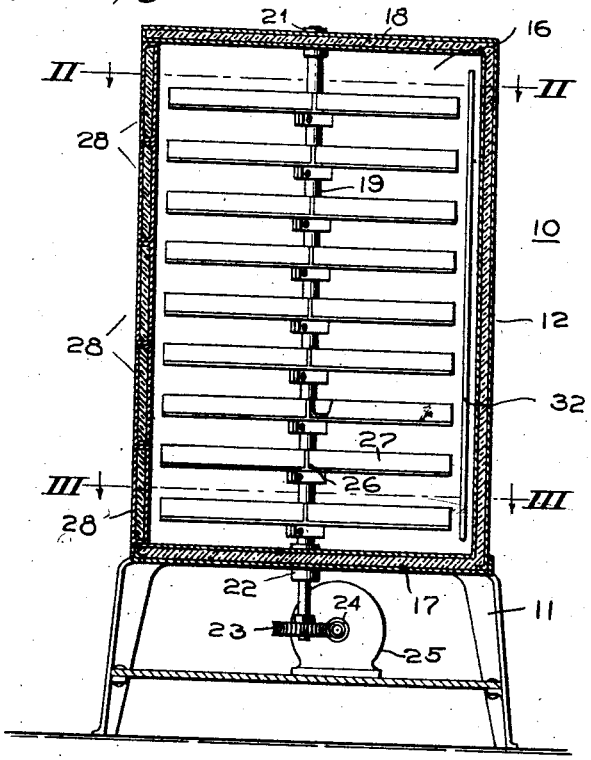
Figure 2:
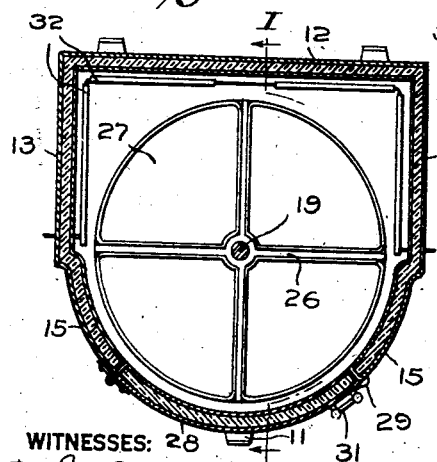
Figure 3:
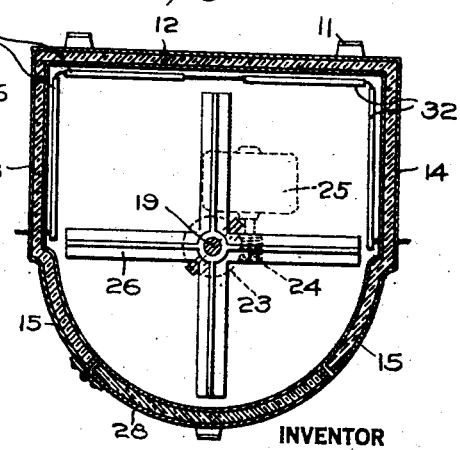

In the drawings, Figure 1 is a view, in vertical section, of an oven embodying my invention, taken on the line I—I of Fig. 2, Fig. 2 is a horizontal sectional view therethrough, taken on the line II—II of Fig. 1, Fig. 3 is a horizontal sectional view therethrough, taken on the line III—III of Fig. 1, Fig. 4 is a vertical sectional view of a modified form of oven embodying my invention, Fig. 5 is a horizontal sectional view therethrough, taken on line IV—IV of Fig. 4, Fig. 6 is a horizontal sectional view therethrough, taken on the line VI—VI of Fig. 4, and Fig. 7 is a fragmentary view, partly in side elevation and partly in section, of a material carrying means employed with the form of oven illustrated in Figs. 4 to 6.

An oven 10 comprises a suitable supporting frame 11 of any desired construction upon which are mounted a plurality of heat-insulating wall panels designated by the numerals 12, 13, 14 and 15. The numeral 12 designates the rear panel, 13 the left-hand panel, 14 the right-hand panel. Each of these three panels or walls is substantially plane in contour and each comprises an inner and an outer metal sheet between which is placed a quantity of heat-insulating material. The heat-insulating wall 15 is substantially semi-circular in contour and the edges thereof operatively engage, and are connected to, the outer edges of the two side walls 13 and 14.

The hereinbefore described heat-insulating panels enclose an oven chamber 16 which may be considered as comprising two portions or compartments, one of which is enclosed by the three plane walls and is, therefore, substantially rectangular in cross section. The front panel 15, of arcuate contour, encloses a portion of the oven chamber which is of substantially, semi-circular contour in cross-section. As the details of construction of the heat-insulating panels or walls constitute no part of my invention, and any desired or suitable construction, usually employed for such purposes, may be used, they are not further described in detail.

To effect a complete enclosure of the oven chamber 16, a bottom heat-insulating panel 17 and a top heat-insulating panel 18 are provided, which co-operate with the other panels to enclose the oven chamber 16.

A shaft 19 is located in the oven chamber 16 and extends vertically therethrough. Suitable bearing members 21 and 22 are provided in the top and in the bottom panel, respectively, in which the shaft 19 is rotatably mounted. The shaft 19 extends below the oven chamber 16 a suitable distance in order that operating means may be connected thereto.

A worm gear 23 is mounted on the lower end of the shaft 19 and is operatively engaged by a worm 24 mounted on the end of the shaft of a suitable driving motor 25, which is mounted on the supporting frame 11. Any suitable or desired means of causing rotation of the shaft 19, in its bearings, may be provided but I have illustrated an electric motor. The worm gear is a preferred form of drive but one which may be replaced by any other suitable or desired means.

A plurality of material-supporting frames 26 are located in the chamber 16 and are suitably clamped in spaced relation on the shaft 19. Each of the supporting frames 26 may comprise a plurality of radially extending arms, here shown as four in number. Each of the arms may be substantially of inverted T-shape in cross-section, and a plurality of trays 27, each of substantially 90° in arcuate extent, are located upon and carried by the respective adjacent arms of the supporting frames 26. This construction permits of easily and quickly removing any one of the trays 27 from the supporting frames 26 to permit of removing therefrom the heat treated material and of placing thereon fresh material to be heat treated within the chamber 16.

The front panel 15 is provided with a plurality of superposed relatively narrow doors 28 which are hingedly mounted at one side of the panel structure, suitable locking means 29 and a handle 31 being provided for each of the doors. I provide a plurality of doors of relatively small height so that access may be had to any desired part of the oven chamber, whereby it is possible to remove heat treated material from any one or two of the trays and of replacing the removed material by fresh material without materially changing the heat conditions of the other parts of the oven chamber when in operation.

A plurality of electric heating elements 32 are located in the oven chamber 16 and may be supported adjacent to the heat insulating panels 12, 13, 14 and 15 in any suitable or desired manner. The heating elements 32 may be of any suitable or desired construction and it is desired that they be of such construction as to distribute the heat evenly and that they extend substantially the entire height of the oven chamber and over at least the greater portion of the internal periphery of the walls 12, 13 and 14.

Referring more particularly to Figs. 4 to 6, inclusive, I have illustrated a modified form of construction which may be advantageous under certain conditions. The same general construction of oven walls, oven chamber and of the vertically extending shaft and its driving means may be employed as hereinbefore described for the construction illustrated in Figs. 1 to 3, inclusive.

At the top of the shaft 19 there is provided a skeleton supporting frame 33, here illustrated as comprising four radially extending arms, each of which is provided with a notch 34 in its upper edge adjacent the outer end thereof. Upon each of the arms of the frame 33 there is suspended a material-supporting structure comprising a plurality of horizontal trays 35 that are maintained in spaced relation by a pair of rods 36. At the top of the structure there is provided a swivel joint 37 and a chain link 38 which is adapted to fit into the notch 34 and support the plurality of spaced trays 35 from the respective arms of the frames 33. At the bottom of the structure comprising the trays 35 and the supporting rods 36, there is provided a central shaft 39 carrying a metal disc 41 having a beveled face which is adapted to operatively engage the co-operating oppositely beveled inner face of a substantially circular track 42 which is located in the oven chamber 16 adjacent the bottom thereof and held in proper operative position by any suitable or desired means.

The shaft 39 extends through the disc 41 a short distance to permit of being located in a suitable opening in a disk 43 which is secured to the shaft 19 and is rotatable therewith. Upon rotation of the shaft 19, the hereinbefore described construction effects a rotative movement of the structure comprising the trays 35 and the rods 36 relatively to the respective carrying arms from which the structures are suspended, whereby any article or material placed upon the respective trays 35 is given a turning movement around a vertical axis and all parts of the materials or objects are brought directly under the influence of the heat from the electric heating elements 32, which were described in connection with Fig. 1 of the drawings.

As the assembled tray structures illustrated in Figs. 4 to 6, of the drawings may be employed to support relatively heavy material, it may be desirable to provide an overhead track whereby the assembled tray structures may be easily and quickly moved into and out of the oven chamber. An overhead track 44 is illustrated in Fig. 7 and is provided with an inclined movable portion 45, the outer end of which may be brought into operative engagement with the ends of the respective arms of the supporting structure and the tray structures moved thereon in a manner well known in the art.

The device embodying my invention may be employed not only in baking-oven structures but also in any type of oven where it is desired to heat treat material in heat-insulated structures. The trays 27, illustrated in Figs. 1 and 2 of the drawings, may be made non-removable instead of removable as illustrated in the drawings, as material may be placed thereon and removed therefrom by the operator without removing and reinserting the respective tray members.

In the modification illustrated in Figs. 4 to 6, the entire tray structures are removable as a unit and where the overhead track construction, illustrated in Fig. 7 is used, much heavier materials or much greater weight may be easily and quickly handled by any operator.

If it is desired to subject all of the materials placed upon the trays 35 to the direct action of the heat from the heating elements 32, the structure illustrated in Figs. 4 to 6, accomplishes this purpose by reason of the rotation of the respective tray structures not only through the furnace chamber but also relatively to their point of suspension, and therefore, of course, relatively to the heating elements.

The modification illustrated in Figs. 4 to 6, inclusive, is of value in applications other than for baking ovens, such for instance as core baking ovens.

Various modifications and changes may be made herein without departing from the spirit and scope of the invention, as set forth in the appended claims.

I claim as my invention:

1. In an oven, in combination, a plurality of heat-insulating walls enclosing an oven chamber, one of said walls of said oven chamber being of arcuate contour and the remaining walls of non-arcuate contour in cross-section, a shaft in said chamber, a plurality of circular trays secured to said shaft, and electric heating elements located only adjacent those walls that are of non-arcuate contour.

2. In an oven, in combination, an oven chamber having walls respectively of arcuate and of non-arcuate contour, in cross-section, a plurality of trays located in both said portions and rotatable therein, and electric heating elements located only adjacent those walls of non-arcuate contour.

3. In an oven, in combination, a plurality of heat-insulating walls enclosing an oven chamber having respectively of arcuate and of angular contour in cross-section, a plurality of trays located in said chamber and rotatable therein, extended electric heating elements located only adjacent those walls of non-arcuate contour and a plurality of doors in one of said walls giving access to said chamber at the side remote from said heating elements.

4. In an oven, in combination, a plurality of substantially plane heat-insulating walls and a heat-insulating wall of arcuate contour enclosing an oven chamber having one portion of substantially rectangular shape in cross-section and an adjacent portion of substantially semi-circular shape in cross-section, a plurality of trays rotatable through both portions of said oven chamber, and electric heating means located adjacent said plane heat-insulating walls in said oven-chamber portion of substantially rectangular shape.

5. In an oven, in combination, a plurality of heat-insulating walls enclosing an oven chamber, a vertically-extending rotatable shaft in said chamber, a plurality of arms secured to and extending radially from said shaft adjacent the upper end thereof, and frames each comprising a plurality of spaced trays, removably suspended from said arms.

6. In an oven, in combination, a plurality of heat-insulating walls enclosing an oven chamber, a vertically-extending rotatable shaft in said chamber, a plurality of arms secured to and extending radially from said shaft adjacent the upper end thereof, frames each comprising a plurality of spaced trays, removably suspended from said arms and means operatively connected to said shaft and located outside of said chamber for causing said shaft to rotate.

7. In an oven, in combination, a plurality of heat-insulating walls enclosing an oven chamber, a vertically-extending rotatable shaft in said chamber, a plurality of arms secured to and extending radially from said shaft adjacent the upper end thereof, frames each comprising a plurality of spaced trays rotatably suspended from said arms, means for causing said shaft to rotate and means for causing said frames to rotate relatively to their respective supporting arms.

8. In an oven, in combination, a plurality of heat-insulating walls enclosing an oven chamber, a vertically-extending rotatable shaft in said chamber, a plurality of arms secured to and extending radially from said shaft adjacent the upper end thereof, a plurality of spaced trays rotatably supported by each of said arms, electric heating elements in said chamber, and means for causing all portions of articles placed on said trays to be subjected to the direct heating action of said heating elements.

In testimony whereof, I have hereunto subscribed my name this 17th day of February, 1923.

ORA A. COLBY.